June 8, 1948. H. SOSKIN 2,442,881
AUTOMOBILE JACK
Filed Oct. 6, 1943 4 Sheets-Sheet 1
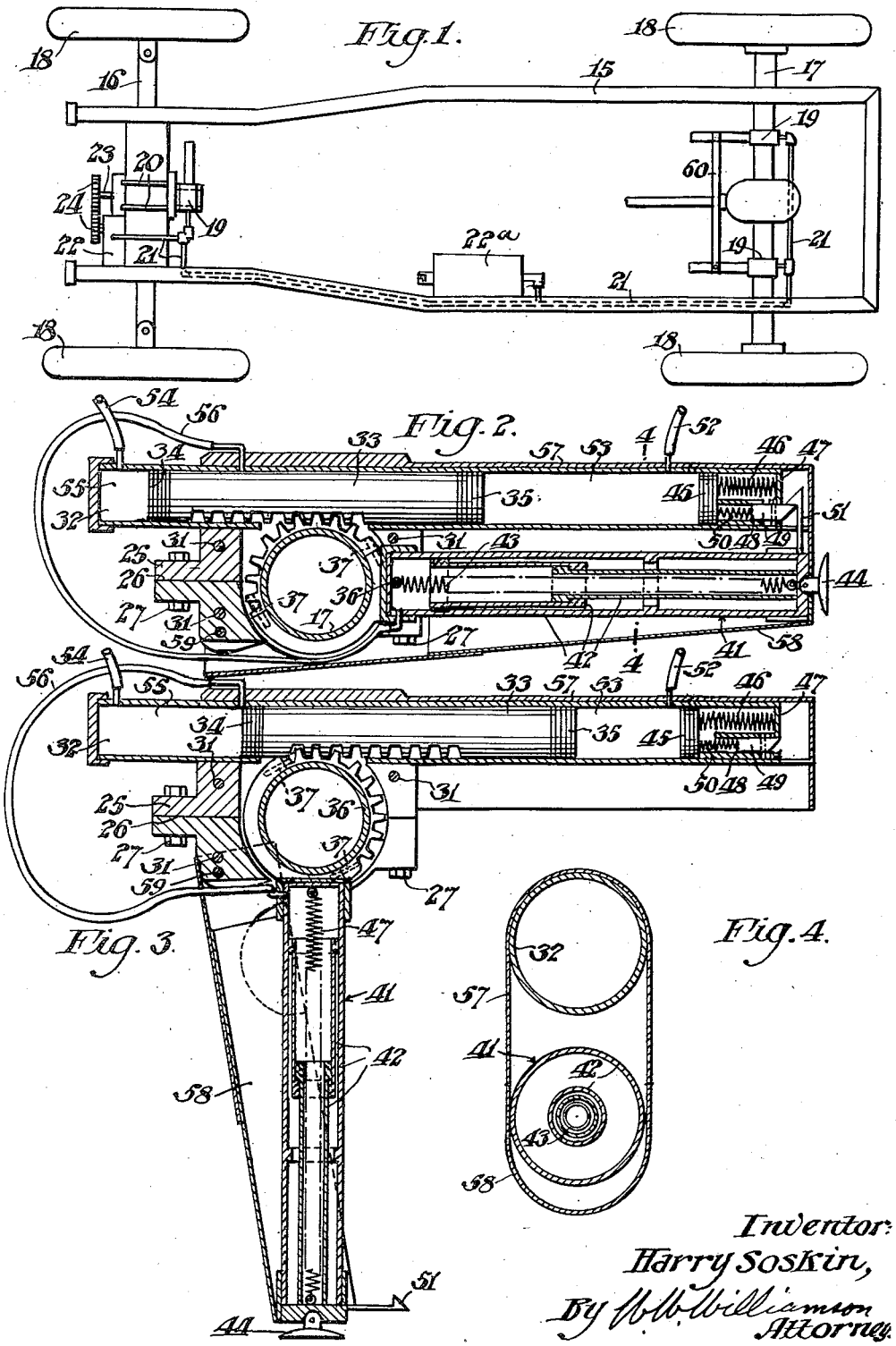
Inventor:
Harry Soskin,
By W.B. Williamson
Attorney

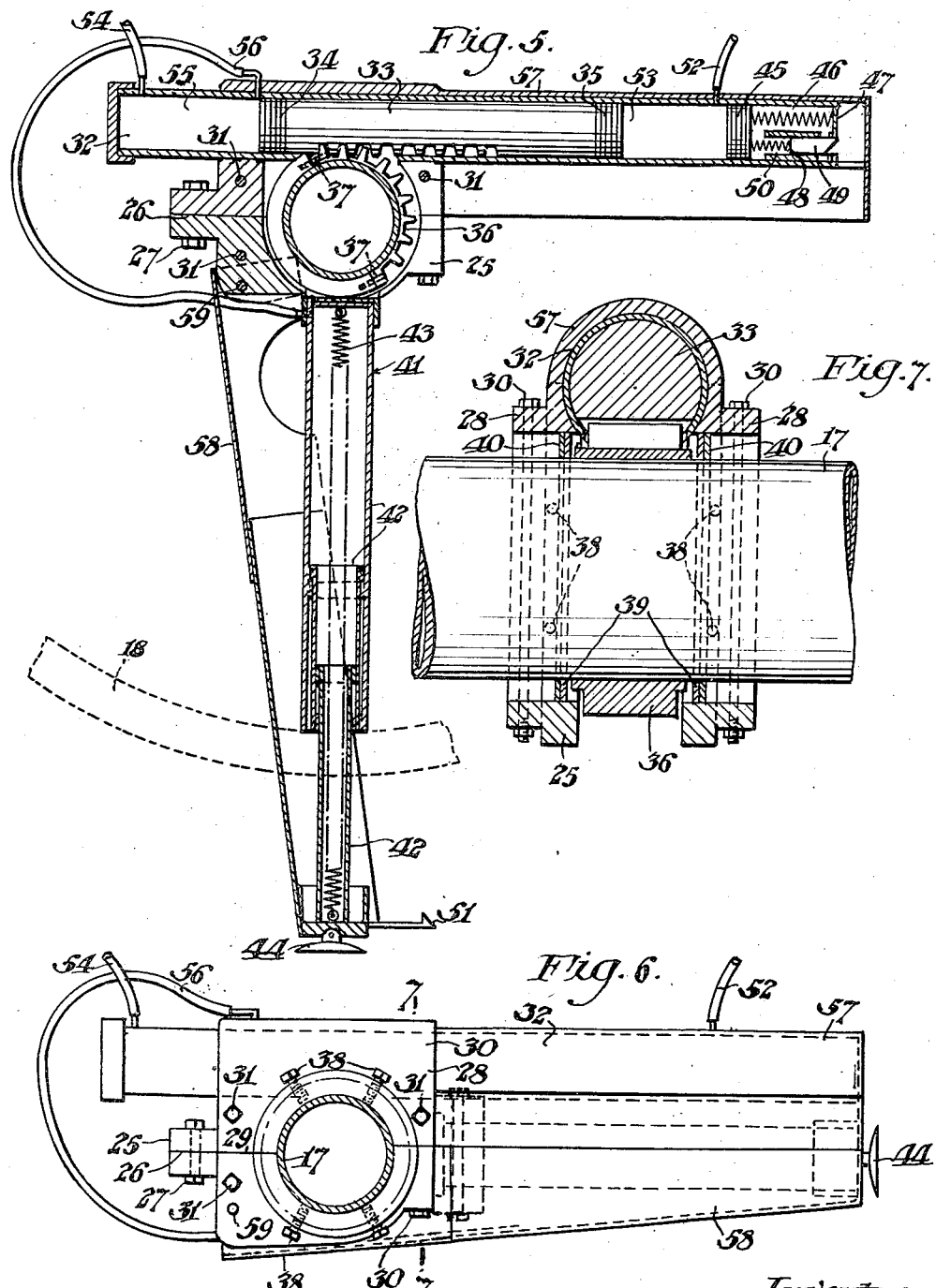

June 8, 1948.  H. SOSKIN  2,442,881
AUTOMOBILE JACK
Filed Oct. 6, 1943  4 Sheets-Sheet 3
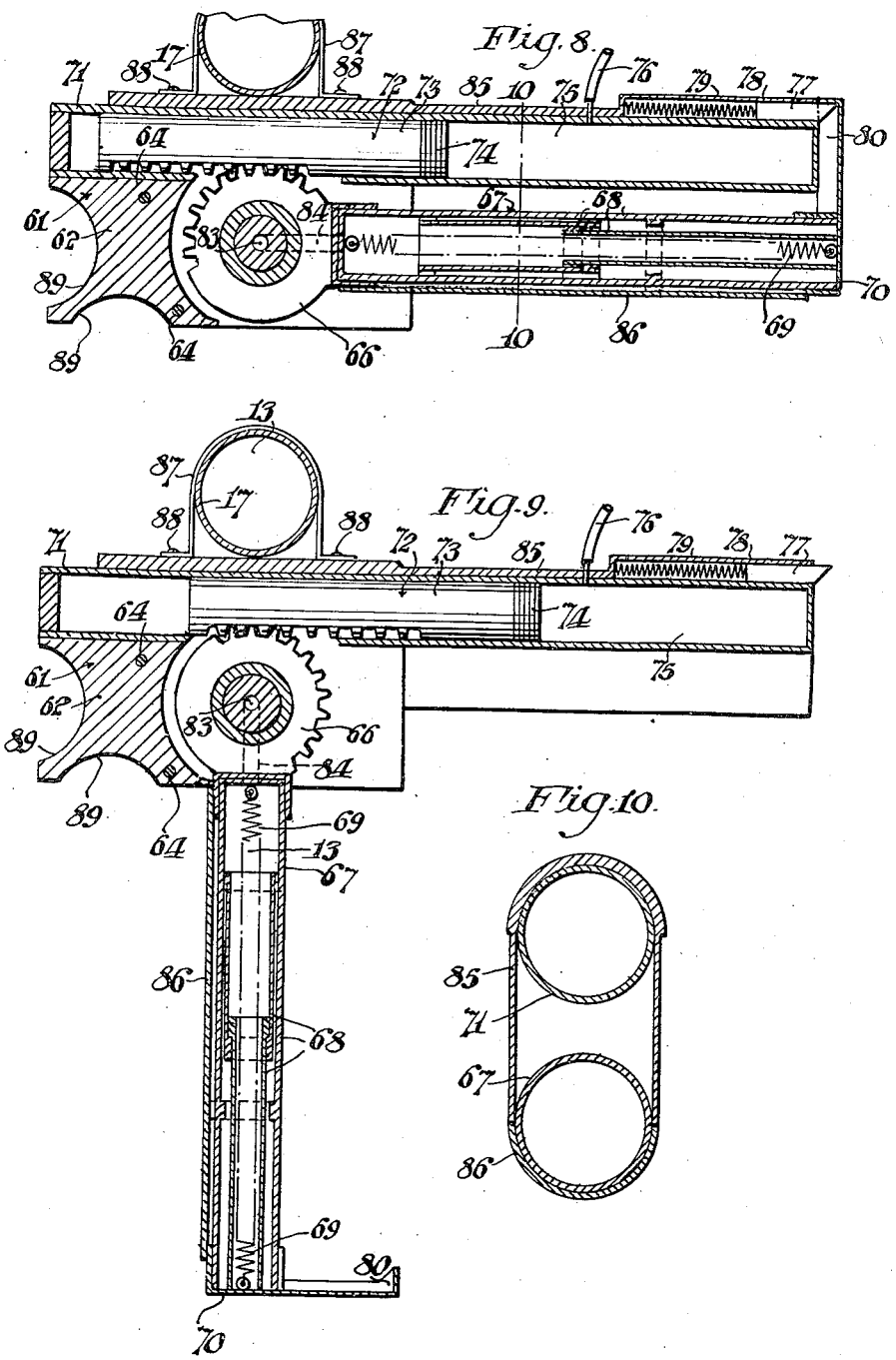
Inventor:
Harry Soskin,
By W. W. Williamson
Attorney.

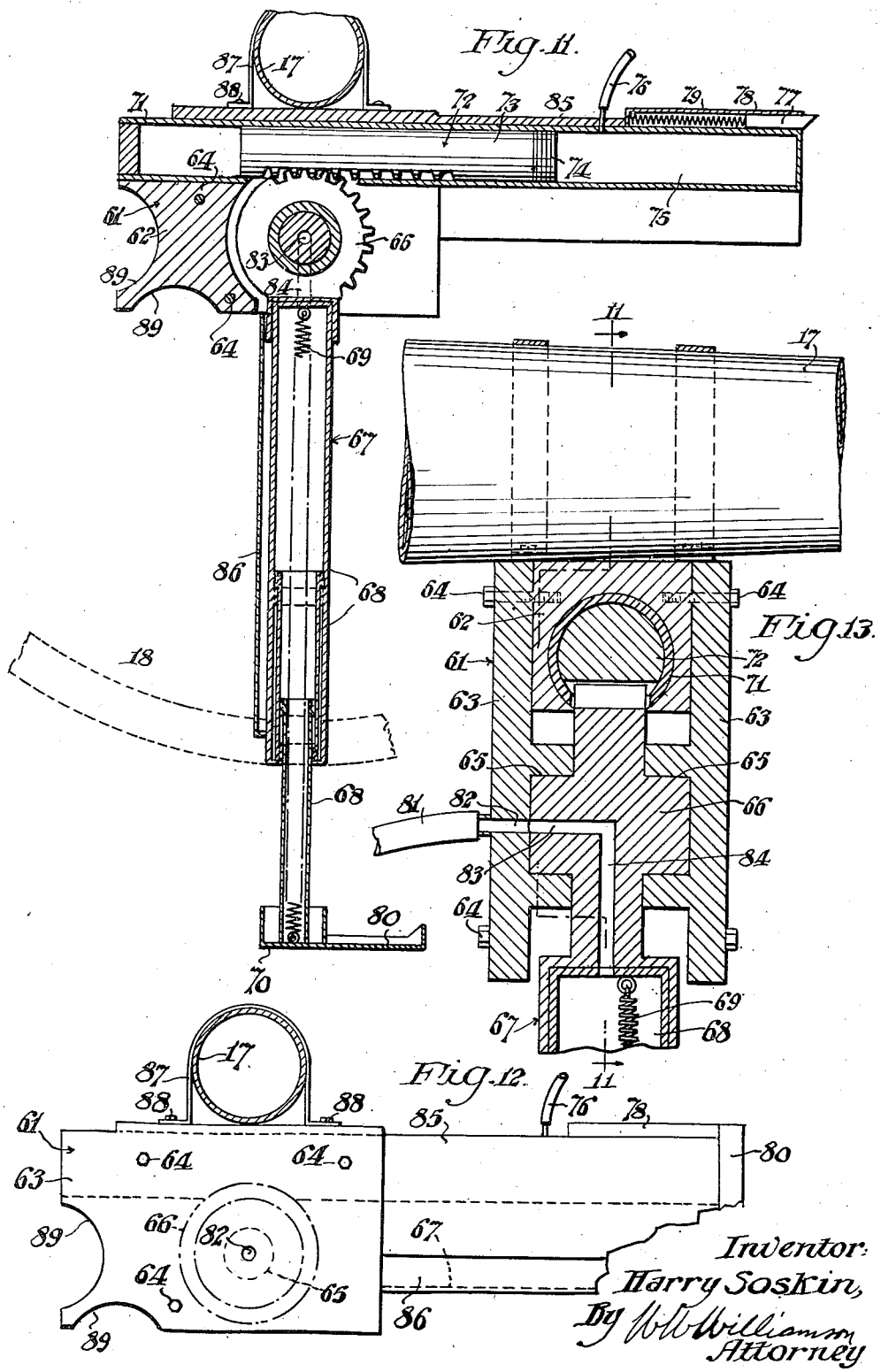

Patented June 8, 1948

2,442,881

UNITED STATES PATENT OFFICE 2,442,881

AUTOMOBILE JACK

Harry Soskin, Philadelphia, Pa.

Application October 6, 1943, Serial No. 505,248

4 Claims. (Cl. 254—86)

My invention relates to new and useful automobile jacks, and has for one of its objects to provide jacks that are maintained in horizontal positions close up beneath the body of the automobile when not in use so as to be out of the way of any articles, deep snow, and the like, on the roads over which the automobile travels.

Another object of the invention is to provide for mounting the jacks on an automobile or other automotive vehicle in a novel manner.

Another object of the invention is to provide an unique means for latching the lifting means or elements of the jacks in the horizontal position when not in use.

A further object of the present invention is to provide pressure operating means for releasing the jacks, permitting them to descend by gravity or positively moving them into vertical positions, distending the lifting means thereof for elevating the vehicle, telescoping said lifting means and finally, positively swinging them back into the horizontal position where they will be latched.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawing forming a part hereof, in which:

Fig. 1 is a plan view of a motor vehicle chassis illustrating one manner in which the jacks may be mounted and depicting a number of ways that they may be actuated.

Fig. 2 is an enlarged longitudinal sectional view of one construction of a jack in a horizontal closed or inoperative position.

Fig. 3 is a similar view when the lifting means has been moved into the vertical position.

Fig. 4 is a further enlarged section on the line 4—4 of Fig. 2.

Fig. 5 also is a sectional view similar to Fig. 3 showing the lifting mechanism distended and illustrating in dotted lines an approximate relation of a wheel when elevated to the jack.

Fig. 6 is a side elevation of a jack to illustrate one way for fixing the jack to a supporting element, such as the housing of a rear axle.

Fig. 7 is an enlarged sectional view on the line 7—7 of Fig. 6.

Fig. 8 is a longitudinal sectional view of another form of the jack shown in the horizontal closed or inoperative position.

Fig. 9 is a similar view after the lifting mechanism has descended to the vertical position.

Fig. 10 is an enlarged section on the line 10—10 of Fig. 8.

Fig. 11 is a view like Fig. 9 with the lifting mechanism distended as taken on the line 11—11 of Fig. 13, and illustrating in dotted lines the approximate position relative of a wheel and the jack when the vehicle is elevated.

Fig. 12 is a side elevation of the jack in the horizontal closed position.

Fig. 13 is an enlarged fragmentary sectional view on the line 13—13 of Fig. 9.

In carrying out my invention as herein embodied, reference being first had to Figs. 1 to 7 inclusive, 15 represents a vehicle chassis including the ordinary frame supported by the front axle 16 and the rear axle 17 which includes the usual housing. On axles are mounted the wheels 18.

On any suitable parts of the vehicle are mounted a number of jacks 19, and for purposes of illustration I have shown two of such jacks connected to the rear axle 17, or more particularly its housing, and one mounted on a trunnion secured to the front axle 16 by appropriate fastening devices, such as U-bolts 20.

To each jack runs a conduit 21, or a branch thereof, for supplying pressure through a fluid, such as air or liquid, from a pump 22. The pump can be manually or mechanically operated but is here shown as actuated by the power of the motor vehicle, for example, the fan belt shaft 23 by gears 24. A tank 22a can be substituted for or used as an auxiliary to the pump. Such a tank can be filled from a compressor at a service station. It is also possible to supply the air from the service station equipment directly to the conduit 21.

All jacks 19 are alike and each comprises a housing body 25 split horizontally, or otherwise, along the line 26 so as to be readily fitted over the supporting member; either an axle, an axle housing, trunnion or similar devices, and the parts of said housing body 25 are fastened together by bolts 27 or equivalent fastening means. Fitted to the sides of the housing body 25 are closure side cheeks 28 which are split along the line 29 to permit the sections to be fitted around the supporting member. Said cheek sections are fastened together by fastening means 30, such as bolts and nuts and the cheeks are secured to the housing body by other fastening means 31.

The housing carries a cylinder 32 having an opening in the bottom thereof which communicates with the interior of said housing. In this cylinder is slidably mounted a combination rack and piston, the numeral 33 denoting the rack portion and the numerals 34 and 35 representing the pistons, one at each end of the rack, so that said rack-piston may be actuated alternately from both ends. The rack teeth mesh with the teeth of a segmental gear 36 projecting through the opening in the bottom of the cylinder 32. The gear is split on a diameter so that it may be fitted over the supporting member 17 and the two sections are secured together by fastening devices 37.

The gear 36 is merely rotatable about the supporting member and has the ends of its hub journalled in the housing, the latter being fixed in place on said supporting member by set screws 38, Fig. 6. The openings at the sides of the gear housing through which the axle or other supporting member protrudes are made dust and grease proof by placing a compressible packing 39, such as a felt washer, in each and inserting a split metal washer 40 behind the packing, both of which will be forced inward and held in place by the set screws 38. Any other equivalent means may be used to pack said openings.

The segmental gear 36 carries a lifting means or mechanism 41 comprised of a number of telescoping tubular members 42 that are normally closed up by the action of the spring 43 and distended through the use of fluid, either air or liquid or both, under pressure and supplied in a manner to be presently described. The outermost one of the tubular members 42 carries a foot 44 which is preferably swingingly attached to said outermost member, either pivoted or swiveled, so as to adjust itself to any surface on which it may rest. Of course the foot may be flat and stationary as will be apparent from the description in connection with the other form of the invention to be later described.

In the forward end of the cylinder 32 and spaced from the rack piston 35 is a latch operating piston 45 that is normally forced inward by a spring 46 engaging said piston 45 as the movable element and a wall 47 in the cylinder as the stationary element. Said latch operating piston 45 carries a forwardly projecting latch casing 48 in which a latch 49 is slidably mounted and normally forced outward by a spring 50 and the nose of said latch can protrude through a hole in the wall 47 to a limited extent.

The above mentioned latch 49 is to be engaged by the hook or keeper 51 carried by the outermost one of the members 42 when all of the members of the lifting means are closed up and said lifting means is in the horizontal position as shown in Fig. 2.

Fluid is forced through the conduit 21, Fig. 1, by the pump 22 and directed by suitable means, such as valves, into the tube of each jack and thence into the chamber 53 between the pistons 35 and 45. This will force the rack 33 rearwardly and the piston 45 and its components forwardly. The movement of the rack rearwardly will raise the lifting means to the horizontal position, if it is in any other location, and the movement of the piston 45 forwardly will move the latch into the path of travel of the hook for engaging the latter to hold the lifting means in the horizontal position.

When it becomes necessary or desirable to lift the vehicle, the fluid in the chamber 53 is released and fluid is directed through the tube 54 into the chamber 55 behind the rack and its piston 34. The releasing of the fluid from chamber 53 permits the spring 46 to force the piston 45 and the latch 49 inward so as to withdraw said latch from the hook or keeper 51, then as fluid enters or the pressure is built up in the chamber 55, the rack 33 will be moved forwardly and impart a rotary motion to the segmental gear 36 to swing the lifting means down into vertical position, Fig. 3.

A flexible tube 56 has one end communicating with the interior of the tubular lifting means 41, or at least the two innermost members 42 of said lifting means, and the other end of said tube 56 is connected with the chamber 55 at a point where the entrance will be covered by the rack 33 until the latter and its piston 34 pass the location of the connection or entrance. The location of the entrance is such that the rack and the piston 34 will pass beyond said entrance just as the lifting means reaches the vertical position thereby completing a line of communication from the chamber 32 through the tube 56 to the lifting means 41. At such a time fluid will pass through the chamber 32, and the tube 56 into the lifting means 41 and distend said lifting means as shown in Fig. 5. This will raise the vehicle and lift its wheels from the ground as illustrated by the position of a wheel in dotted line in Fig. 5.

To return the lifting means to the horizontal position, the pressure is relieved from the chamber 55 and said lifting means to permit the fluid to exhaust and thereafter the spring 43 will act to close up the members 42 of the lifting means. Then by directing fluid into the chamber 53 the latch mechanism will be moved forwardly and the rack rearwardly. As the rack is actuated, the lifting means will be swung upward and the hook or keeper 51 will push the latch back into its casing against the action of the spring 50 until the nose of the hook 51 has passed the nose of the latch 49, when the latter will be projected outwardly by said spring 50 to engage beneath the nose of said hook.

For purposes of illustration only, I have shown a shell embracing the cylinder 32 but open along the bottom and coacting with this shell is a bottom closure 58. This will keep out dust, mud, snow or other foreign matter from the operating parts of the jack. The outer end of said closure 58 is pivotally connected to the outermost member of the lifting means 41 while its inner end is pivoted at 59 to the gear housing. The bottom closure 58 is composed of a number of sections slidable longitudinally relative to one another to compensate for differences between the axes of rotation of the lifting means and said closure and for extension when the lifting means is distended.

Obviously the cylinder 32 and the innermost member 42 of the lifting means could be formed from two similar bars of material and chambered to provide a cylinder bore for the pistons and rack and the extensible members of the lifting means. This would eliminate the necessity for the shell and closure.

To further support the jacks and thereby prevent any possibility of them dropping down or rattling, hangers, one of which is shown at 60 in Fig. 1, are provided on suitable parts of the vehicle and the outer ends of the jack cylinders or shells are fastened to such hangers in any desirable manner. The hangers can be fashioned to fit around the drive shaft housing or connected by an upright.

In that form of individual jack illustrated in

Figs. 8 to 13 inclusive, 61 represents the gear housing comprising the chambered or recessed housing body 62 and the side cheeks 63 held in place by the fastening devices 64, such as bolts and nuts. The cheeks 63 have internal sockets 65 forming bearings for the hub of the segmental gear 66 mounted in the gear housing.

The gear 66 carries the lifting means 67 comprised of a number of telescoping tubular members 68 that are normally closed up by the spring 69 and distended through the use of fluid, either air or liquid or both, under pressure supplied from a suitable source as previously specified in connection with the first described form of the invention. The outermost one of the tubular members 68 carries a foot 70 which may be flat and solid, as shown, or it may be similar to the foot 44. In fact it is to be understood that any of the parts of the two forms of the invention are interchangeable where possible.

The teeth of the segmental gear 66 project through an opening in the bottom of the cylinder 71 which is carried by the housing 61 and mesh with the rack teeth of the combined rack and piston 72 including the rack 73 and the end piston 74. In this form of the invention the chamber at the rear of the rack is not air tight but the forward chamber 75 is, so that fluid entering said chamber 75 through the tube 76 will act upon the piston 74 to force it and the rack rearwardly.

In order to normally retain the lifting means 67 in a horizontal position parallel with and underneath of the cylinder 71, a spring actuated latch 77 is carried by the cylinder 71 in a casing 78 with a spring 79 to normally force said latch outward. A hook or keeper 80 is carried by the outermost one of the members 68 of the lifting means or, more particularly, by the foot 70 for cooperation with the spring actuated latch 77 as may be readily comprehended by reference to Fig. 8.

For releasing the hook or keeper from the latch 77 and also for distending the lifting means 67, fluid under pressure is directed through a tube 81, Fig. 13, a hole 82 in the gear housing, particularly one of the cheeks, a bore 83 in the axis of the gear, and a radial bore 84, also in the gear between the inner end of the bore 83 and the perimeter of said gear, to the interior of said lifting means 67.

A shell 85 may embrace the cylinder 71 and may be a part of the gear housing or a separate element and attached at the rear end to said housing. In any event this shell is open along the bottom and coacting therewith is a bottom closure 86 carried by the lifting means so that when the latter is in a horizontal position it will be completely enclosed to prevent clogging by dust, mud, snow or other foreign substances.

The entire apparatus may be installed on a vehicle in a manner similar to that shown in connection with the first described form of the invention or it may be installed below, above, in front or to the rear of the supporting means 17, representing an axle, an axle housing, a trunnion or other device. Any suitable retaining means may be utilized for securing the apparatus to the support and for purposes of illustration I have shown U-shaped straps 87 embracing said support and attached to the housing 61 by fastening devices 88. The housing 61 may have recesses or notches 89 in one or more appropriate locations to register with the support 17 and might be used to assist in mounting the apparatus on the support.

Assuming the parts to be in the positions illustrated in Fig. 8 and it becomes necessary or desirable to jack up the vehicle, then fluid is directed through the tube 81, hole 82 and bores 83 and 84 to the interior of the lifting means, in a sufficient amount to first distend said lifting means a distance great enough to merely release the hook or keeper 80 from the latch 77. The lifting means 67 now will drop down by gravity to the vertical position as shown in Fig. 9. Thereafter additional fluid is directed into said lifting means and the latter will be distended to raise the vehicle.

Upon release or exhaustion of the fluid from the lifting means, the weight of the vehicle will partially close up said lifting means until the vehicle wheels touch the ground. The spring 69 then will complete the closing up action until the foot 70 is free. Fluid may now be directed through the tube 76 into the chamber 75 to force the rack and piston rearwardly. This will swing the lifting means 67 upward to the horizontal position. As the hook or keeper 80 strikes the latch 77 it will be forced inward against the action of its spring 79 until the nose of said hook 80 passes the nose of the latch 77 when the latter will be projected forwardly under the nose of the hook to retain the lifting means in its horizontal position until further use is necessary or desirable.

The segmental gear in each form of the invention is so fashioned that the teeth terminate at the point where the periphery of said gear meets the rack when the lifting means is in the vertical position. This acts as a stop to limit the downward swing of the lifting means and as a further stop the gear housing may be formed so that the lifting means will contact a portion of said gear housing just as said lifting means reaches the vertical position.

Of course I do not wish to be limited to the exact details of construction herein shown and described as these may be varied within the scope of the appended claims without departing from the spirit of my invention.

Having described my invention what I claim as new and useful is:

1. An automobile jack comprising a split gear housing to be mounted on a supporting part of a vehicle, a split gear to surround the supporting part and journalled in the gear housing, an extensible lifting means comprised of a plurality of telescoping tubular members carried by said gear and to be extended by fluid under pressure, a cylinder carried by the gear housing and having a bottom opening through which a portion of the gear projects, and a rack in said cylinder meshing with the gear and operated longitudinally to lower the lifting means and also raise it to a horizontal position where it remains when not in use.

2. The automobile jack of claim 1, in combination with a latch operating piston in the cylinder adapted to be operated in one direction by a fluid under pressure, a spring actuated latch carried by said piston, and a hook carried by the lifting means to engage said latch for holding said lifting means in the horizontal position.

3. In a device of the character described, a vehicle, a plurality of housings mounted on the vehicle, extensible lifting means swingingly journalled in said housings, gears connected to said lifting means, cylinders mounted on said housings, racks in said cylinders to be fluid operated in both directions and meshing with the gears to alternately swing the lifting means between the horizontal and vertical positions, conduits between the cylinders and lifting means normally closed by the racks and uncovered as the lifting means reaches the vertical position to permit fluid to pass from the cylinders to the lifting means to extend the latter, latches in the cylinders and fluid operated to force them outward, springs to urge the latches inwardly, and hooks on the lifting means to engage the latches for holding the lifting means in the horizontal position.

4. In an automobile jack of the character described, a split gear housing having the sections thereof mounted in opposed relation on a supporting part of an automobile, means to clamp said sections together, a split gear having the sections thereof mounted in opposed relation on said supporting part of the automobile and journalled in said gear housing, means to clamp the gear sections together, an extensible lifting means carried by said split gear, and means supported by the gear housing for transmitting motion to the split gear.

HARRY SOSKIN.

REFERENCES CITED

The following references are of record in the file of this patent:

UNITED STATES PATENTS

| Number | Name | Date |
|---|---|---|
| 1,784,428 | Goldman | Dec. 9, 1931 |
| 1,836,962 | Goldman | Dec. 15, 1931 |
| 1,927,561 | Deutsch | Sept. 19, 1933 |
| 2,048,264 | Harris | July 21, 1936 |
| 2,199,870 | Barr | May 7, 1940 |
| 2,233,732 | Campbell | Mar. 4, 1941 |
| 2,237,167 | Skavinsky | Apr. 1, 1941 |

FOREIGN PATENTS

| Number | Country | Date |
|---|---|---|
| 336,723 | Great Britain | Oct. 23, 1930 |